United States Patent
Park et al.

[11] Patent Number: 5,923,612
[45] Date of Patent: Jul. 13, 1999

[54] SYNCHRONOUS SEMICONDUCTOR MEMORY DEVICE HAVING MACRO COMMAND STORAGE AND EXECUTION METHOD THEREFOR

[75] Inventors: Chul Woo Park, Seongnam; Myung-Chan Choi, Suwon, both of Rep. of Korea

[73] Assignee: Samsung Electronic. Co., Ltd., Suwon, Japan

[21] Appl. No.: 08/928,595

[22] Filed: Sep. 12, 1997

[30] Foreign Application Priority Data

Sep. 12, 1996 [KR] Rep. of Korea .................. 96-39577

[51] Int. Cl.⁶ .................................................. G11C 8/00
[52] U.S. Cl. ............... 365/233; 365/189.07; 365/230.02; 365/236
[58] Field of Search ................................ 365/233, 236, 365/189.07, 230.02

[56] References Cited

U.S. PATENT DOCUMENTS

| | | | |
|---|---|---|---|
| 5,384,745 | 1/1995 | Konishi et al. | 365/233 |
| 5,596,545 | 1/1997 | Lin | 365/233 |
| 5,600,605 | 2/1997 | Schaefer | 365/233 |
| 5,668,773 | 9/1997 | Zagar et al. | 365/233 |
| 5,708,611 | 1/1998 | Iwamoto et al. | 365/233 |

*Primary Examiner*—David Nelms
*Assistant Examiner*—Tuan T. Nguyen
*Attorney, Agent, or Firm*—Marger Johnson, & McCollom P.C.

[57] ABSTRACT

A semiconductor memory device having a macro command function includes a macro storage section for storing a series of external instructions synchronized with a clock signal and a plurality of interval data corresponding to a number of clock pulses occurring between the external instructions. A counter is also included for counting the clock pulses and for producing an output representing a number of clock pulses occurring since an initialization of the counter, and a selecting section is included for selecting between a current external instruction synchronized with the clock signal and the external instructions read out from the macro storage section. A comparing section is included for comparing the interval data of the appropriate external instruction from the macro storage section with an output of the counter, and a macro control section is included for controlling the macro storage section in response to a macro store command so that the series of external instructions and the number of clock pulses counted by the counter are stored in the macro storage section. The macro control means also controlling the selecting section to select the macro storage section in response to a macro execute command so that the series of instructions stored in the macro storage section are sequentially read out. The macro control also produces a next command when the interval data of the read-out external instruction equals the output of the counter.

21 Claims, 5 Drawing Sheets

| PIN<br>FUNC | MAC | $A_0 \sim A_{j-2}$ | $A_{j-1}, A_j$ |
|---|---|---|---|
| STORE START | High | Register Designation | 10 |
| STORE EXIT | High | X | 00 |
| RECALL | High | Register Designation | 01 |
| Normal operation | Low | Valid | Valid |

| | One MACRO Register | |
|---|---|---|
| CN | | CC |
| 1 | ACT | 0 |
| 2 | Write | 3 |
| ⋮ | ⋮ | ⋮ |
| M | Precharge | 2 |

| MACRO Mapping Table | |
|---|---|
| MACRO REGISTER | CN |
| 1 | 1 |
| ⋮ | ⋮ |
| n | 100 |

FIG.9

FIG.8

SYNCHRONOUS SEMICONDUCTOR MEMORY DEVICE HAVING MACRO COMMAND STORAGE AND EXECUTION METHOD THEREFOR

BACKGROUND OF THE INVENTION

1. Field of the Invention

The present invention relates generally to semiconductor memory devices. In particular, the present invention relates to a macro command function and a method of storing and executing the same within a synchronous semiconductor memory device.

2. Description of the Prior Art

The performance of personal computers is rapidly increasing, as is their role as the core of the multi-media revolution. Correspondingly, their markets are continuously growing and expanding. This continuous market expansion is primarily due to improvements in the performance of the microprocessors used in personal computers; improvements both in their operational processing capability and in their operational frequency. In connection with these improved microprocessors, having greatly increased operating speeds, the operating speed of the memory devices communicating with them has also greatly increased.

Recently, for example, a synchronous dynamic random access memory (DRAM) has been introduced as a high speed memory device. The synchronous DRAM executes operating instructions, in sync with the clock frequency of the system. Thus, the interval between sequential operating instructions can now be recognized by the number of clock cycles occurring between those instructions.

In general, the external instructions given to the semiconductor memory device are repetitive, but, they are still preferably given every cycle. Specifically, in a central processing unit (CPU) of a personal computer, since the frequency of the instructions employed during access of a memory has been increased, a greater bandwidth is also required to provide an increased speed of data access. As used here, the term "bandwidth" refers to the transmissible amount of data per second. As the operating speed of a CPU increases, the operating speed of a memory is required to increase correspondingly. Unfortunately, to accomplish this successfully, the size and cost of a computer chip must also be increased.

To improve performance and increase convenience, a personal computer generally has a software implemented macro command function. A macro command consists of a preset or pre-combined chain of operating instructions. When a macro command is executed, the system sequentially executes the preset chain of operating instructions. Thus, the number of operating instructions required to accomplish the same task is reduced, not only providing convenience in use, but also resulting in a reduction in the required bandwidth.

Unfortunately, software implemented macro command functions require memory and bandwidth in order to operate themselves because the software must still transmit a number of instructions to the memory device in order to retrieve the stored information comprising the macro command. There is currently no corresponding hardware specifically designed for implementation of the macro function. What is needed in the industry, therefore, is an implementation of the macro command function within a semiconductor memory device which efficiently reduces the required bandwith and provides effective and systematic memory access.

SUMMARY OF THE INVENTION

According to the needs of the industry, therefore, it is an object of the present invention to enable a memory to be effectively accessed with a lower bandwidth, resulting from a reduction in the frequency of the commands required during a CPU's access of memory from a semiconductor memory device.

It is a further object of the present invention to provide a memory controller which uses its own macro command set, resulting in an effective and systematic access of memory from a semiconductor memory device.

It is yet another object of the present invention to provide a new conceptual device having a leading function, so that system designers can freely make and use macro commands suitable for their own circumstances.

It is a further object of the present invention to enable a macro command comprising a series of external instructions to be stored in a synchronous semiconductor memory device such that the external instructions may be sequentially executed using an externally-provided macro execute command.

In order to accomplish the foregoing objects, the present invention provides a synchronous semiconductor memory device with a macro command function by supplying a controller configured to execute a macro command comprising a series of external operating instructions stored in a semiconductor memory device. The present invention further provides a method of storing a macro command in and a method of executing a macro command from a synchronous semiconductor memory device.

According to the present invention, a semiconductor memory device of a first preferred embodiment includes a macro storage means for storing a series of external instructions synchronized with a clock signal. The macro storage means further stores a plurality of interval data values, each interval data value associated with a respective one of the external instructions and corresponding to a number of clock pulses occurring between the respective external instruction and an immediately previous instruction. A means for counting counts the clock pulses and supplies an output representing a number of clock pulses occurring since an initialization operation of the means for counting. A means for selecting selects between a current external instruction and one of the external instructions stored in the macro storage means. A means for comparing compares the interval data with the output of the counting means. A macro control means controls a store operation in response to a macro store command, thereby storing the series of external instructions and the interval data values within the macro storage means. The macro control means also controls the means for selecting to select a first external instruction from the series of external instructions in the macro storage means in response to a macro execute command. The macro control means further controls a read-out of the external instructions from the macro storage means by executing the selected external instruction and supplying a next command to select the next external instruction in the series, when the output of the counting means is equal to the interval data value for the selected external instruction. The macro control means also executes an initialization command to perform an initialization operation of the means for counting and the read-out steps are repeated, such that the external instructions stored in the macro storage means are sequentially read out. When a last external instruction in the series of external instructions has been executed, a macro terminate command terminates the execution of the macro command.

In a second preferred embodiment of the present invention, a semiconductor memory device comprises a plurality of macro storage means for storing a plurality of macro commands, each comprising a series of external instructions synchronized with a clock signal and a plurality of interval data values. Each interval data value is associated with a respective one of the external instructions and represents a number of clock pulses between a previous one of the external instructions and the respective one of the external instructions. A means for counting counts a number of clock pulses of said clock signal and produces an output corresponding to the number of clock pulses occurring since an initialization operation of the means for counting. Furthermore, a first selecting means selects between a current external instruction synchronized with said clock signal and one of the external instructions stored in said plurality of macro storage means. A second selecting means selects the interval data value corresponding to a selected one of the external instructions from a selected one of the macro storage means, as selected by a macro control means. A means for comparing compares the interval data value selected by the second selecting means with the output of said counting means and sends a coincidence signal to the macro control means when the interval data is equal to the output of the counter.

The macro control means controls the plurality of macro storage means to perform a store operation in response to a macro store command, whereby the series of external instructions and said interval data values are stored in the selected macro storage means. The macro control means also controls said first and second selecting means, thereby selecting an external instruction of a macro command stored in one of the macro storage means in response to a macro execute command and selecting a corresponding interval data value. The macro control means also controls a read-out of the macro command, sequentially reading out said series of external instructions by executing the selected external instruction and reading out a subsequent external instruction in the series in response to the coincidence signal from the means for comparing.

A method of storing a series of external instructions as a macro command, according to an aspect of the present invention, comprises several steps. Initially, a macro control signal and a selection command are applied. Then, when a plurality of macro storage means are present, one of the macro storage means is selected in response to said selection command. A macro store command is then applied, and an initialization operation of the clock counter is performed in response to the macro store command. Next, a macro command comprising a plurality of external instructions and a corresponding plurality of interval data values, representing the number of clock pulses counted by the clock counter in response to a chip selection signal, is stored in the selected macro storage means. Finally, the macro storing step is terminated in response to a macro termination command.

In still another aspect of the present invention, a method of executing a macro command stored in a macro storage means comprises several steps. First, a macro control signal and a selection command are applied. Second, when the embodiment comprises a plurality of macro storage means, one of a plurality of macro storage means is selected in response to said selection command. Next, a macro execute command is applied. An initialization operation is performed in response to said macro execute command to initialize a clock counter. The clock counter then counts a number of clock pulses occurring since the initialization and produces a corresponding output. Also, an external instruction and a corresponding interval data value are read out from the selected macro storage means. The interval data value is then compared with the output of said clock counter. When the output of the clock counter is equal to the interval data value, the external instruction is executed as an internal instruction, the clock counter is again initialized, and a subsequent external instruction and its corresponding interval data are read out from the selected macro storage means. Finally, the execution of the macro command is terminated when the series of external instructions have been executed by repeatedly performing said steps as above.

BRIEF DESCRIPTION OF THE DRAWINGS

The above objects as well as other features and advantages of the present invention will become more apparent through the descriptions of the preferred embodiments, discussed with reference to the accompanying drawings, in which.

DETAILED DESCRIPTION OF THE PREFERRED EMBODIMENTS

Figure 1:
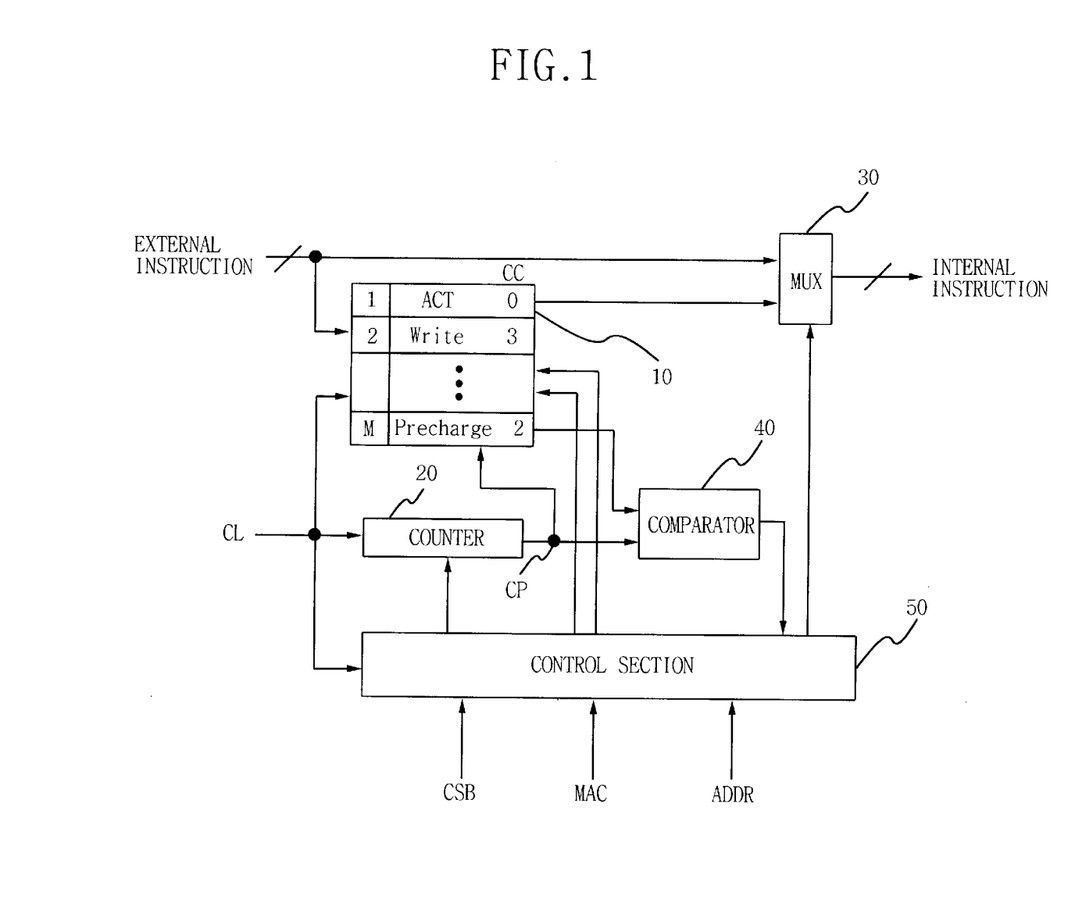
FIG. 1 is a block diagram of a synchronous semiconductor memory device having a macro command function according to a first embodiment of the present invention.

Referring to FIG. 1, a synchronous semiconductor memory device having a macro command function comprises a macro storage section 10 for storing a series of external instructions (i.e., RASB, CASB, WEB, and ADDR) synchronized with a clock signal CL and a plurality of interval data values CC (i.e., 0, 3, ..., 2), each interval data corresponding to a respective one of the external instructions and representing a number of clock pulses occurring between the respective external instruction and a previous instruction. A counting section 20 counts a number of clock pulses from clock signal CL occurring since an initialization operation and produces a corresponding output CP. A selection section 30 selects between a current external instruction synchronized with the clock signal CL and one of the external instructions from the series of external instructions stored in the macro storage section 10 and produces the selected external instruction as an internal instruction. A comparing section 40 compares the interval data value CC, corresponding to the selected external instruction read out from the macro storage section 10, with the output CP from the counting section 20. When the output CP equals the interval data value CC of the selected external instruction, the comparing section 40 transmits a coincidence signal to a macro control section 50. Furthermore, the macro control section 50 controls the macro storage section 10 in response to a number of macro operation commands. In response to a macro store command, the macro control section 50 executes a store operation, storing the series of external instructions and their corresponding interval data values CC, determined during the store operation by the counting section 20, in the macro storage section 10.

The macro control section 50 also controls the selecting section 30, in order to select the external instructions stored in the macro storage section 10 in response to a macro execute command. Specifically, the macro control section 50 causes the selecting section 30 to select a first external instruction from the series of external instructions in response to the macro execute command. Upon receiving the coincidence signal from the comparing section 40, the macro control section 50 transmits a next command to the selecting section 30. When the next command is executed, the selected external instruction is executed as an internal instruction and a subsequent external instruction stored in the macro storage section 10 is selected. This process is repeated until all of the external instructions in the series of external instruction have been sequentially executed at the proper intervals.

Figure 2:
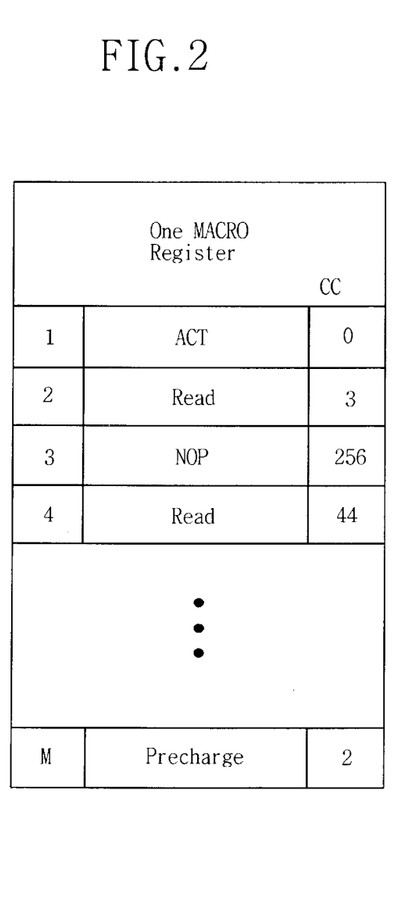
FIG. 2 is an illustration explaining a macro process for maintaining an interval integrity between external instructions within the macro command of the synchronous semiconductor memory device of FIG. 1 when the number of clock pulses occurring between the external instructions exceeds the maximum value of a counter.

Referring to FIG. 2, a macro process for maintaining the integrity of an instruction interval between external instructions in a series of external instructions within a macro command operates even when the number of clock pulses between external instructions exceeds a maximum. According to this macro process, if a number of clock pulses between a pair of external instructions exceeds an upper limit counted value (i.e., 256 pulses) of the counting section 20, a dummy instruction NOP (no operation) and the upper limit counted value (i.e., 256) are stored in the macro storage section 10 between those external instructions. The counter 20 is initialized and the counter begins counting the number of lock pulses between the NOP instruction and the next external instruction, which is subsequently stored in the macro storage section 10 when the next external instruction is finally applied. In this way, the instruction interval of the external instructions is retained within the macro command, even when it exceeds the otherwise limiting upper limit counted value.

Figure 3:
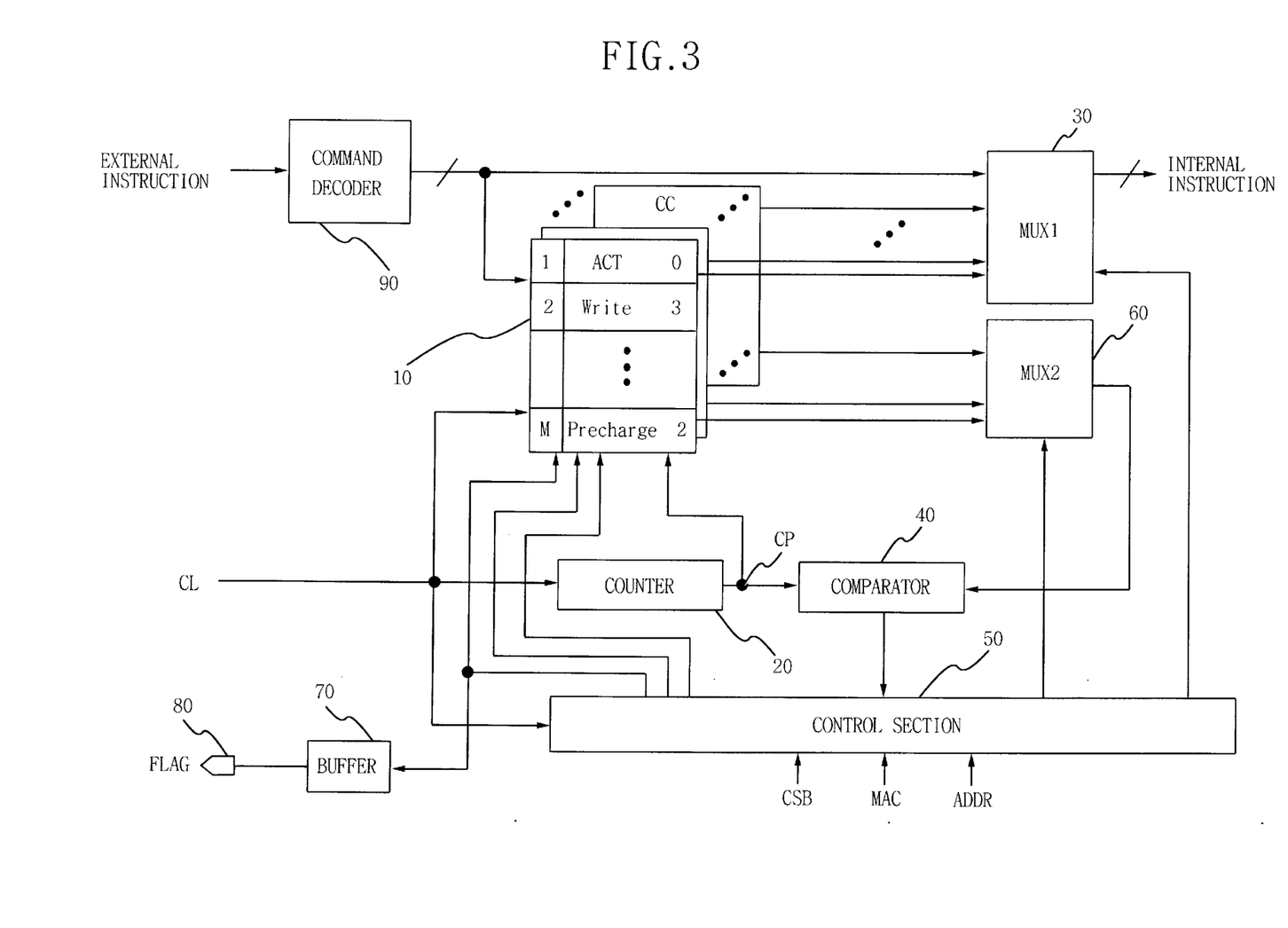
FIG. 3 is a block diagram of a synchronous semiconductor memory device having a macro command function according to a second embodiment of the present invention.

Referring to FIG. 3, a synchronous semiconductor memory device having a macro command function according to a second preferred embodiment comprises a plurality of macro storage sections 10 for storing multiple macro commands. A counting section 20 counts a number of clock pulses occurring since an initialization operation and produces a corresponding output CP. An output buffer 70 for buffering the macro execute command and an output terminal 80 for externally outputting the macro execute command provided through the output buffer 70 are also included.

A control section 50 controls the plurality of macro storage sections 10 in performing a store operation. In response to a macro store command, a macro command comprising a series of external instructions and a plurality of interval data values CC, each interval data value representing a number of clock pulses occurring between a previous and a respective external instruction, as counted by the counting section 20, is stored in a selected one of the macro storage sections 10.

The macro control section S0 also controls a first selection section 30 to select one of the external instructions from a selected one of the macro storage sections 10 in response to a macro execute command and a second selection section 60 to select the corresponding interval data value CC. The macro control section 50 further controls the selected macro storage section 10 to perform a read-out operation of the macro command in response to the macro execute command, such that the series of external instructions are sequentially read out therefrom. The macro control section 50 executes a next command in response to a coincidence signal from a comparing section 40, transmitted when the output CP of the counter 20 equals the interval data value CC read-out by the second selection section 60.

Furthermore, a command decoding section 90 is included for decoding the series of external instructions as they are applied to the synchronous semiconductor memory device via an external command code. The command decoding section 90 decodes the applied external instructions (such as RASB, CASB, etc.) and the decoded instructions (such as Act, Write, Read, etc.), are then stored in the macro storage sections 10. The command decoding section 90 also identifies an effective command and a NOP (no operation) command. In this embodiment, the macro control section 50 inputs a chip selection signal CSB so as to identify the effective command and the NOP command during the macro storage operation.

In each of the preferred embodiments, the macro storage section 10 may comprise various kinds of memories such as a read only memory (ROM), a non-volatile memory, a latch, a static random access memory (SRAM) cell, a dynamic random access memory (DRAM) cell, etc. Depending on the type of memory used, the macro command may be temporarily or more permanently stored. Particularly, where the macro storage section 10 comprises a ROM, the macro command can be permanently stored in the ROM and thus defined as a default macro command. Specifically, any macro command which has a high frequency of use will ideally be stored in a more permanent memory structure, such as a ROM. For instance, when a memory test command is desired as a default macro command, a separate test terminal can be removed from the semiconductor memory device and, thereby, the test timing can be decreased, resulting in an increase in the number of parallel processes which can be performed during the testing operation and contributing to an overall improvement in productivity. When the macro storage section comprises a non-volatile memory, the effort normally required for repeated storing of the macro command in the storage section is saved.

Figure 4:
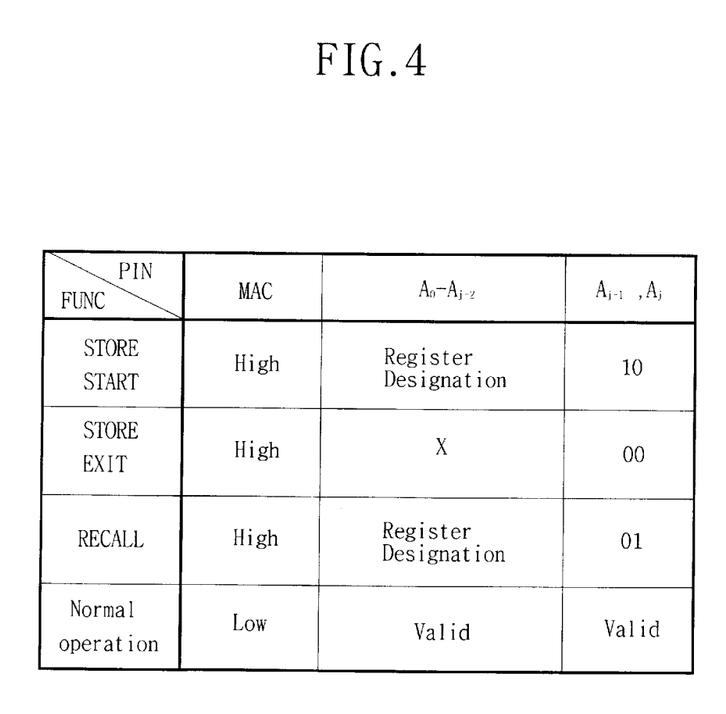
FIG. 4 is an illustration explaining a macro control signal and a set of macro operation commands of the synchronous semiconductor memory device of FIG. 3.

Referring to FIGS. 1, 3 and 4, the macro operation commands according to the present invention are given by a macro control signal MAC and an address signal ADDR. Specifically, the macro operation commands such as a macro store command, a macro storage termination command, a macro execute command, etc., are constituted by a combination of an upper two bits of the address signal ADDR The combination of the remaining bits of the address signal ADDR constitutes selection information which controls selection by the first selection section 30 between one of the external instructions of a selected one of the macro storage sections 10 (in the second preferred embodiment) and a current external instruction. The selection information also controls the second selection section 60 to select the appropriate interval data value CC. Specifically, if the macro control signal MAC goes to a high level, the selection section 30 selects and outputs one of the external instructions from the macro command stored in the selected macro storage section as an internal instruction, while if the macro control signal MAC goes to a low level, the selection section 30 selects and outputs the current external instruction as an internal instruction.

Figure 5:
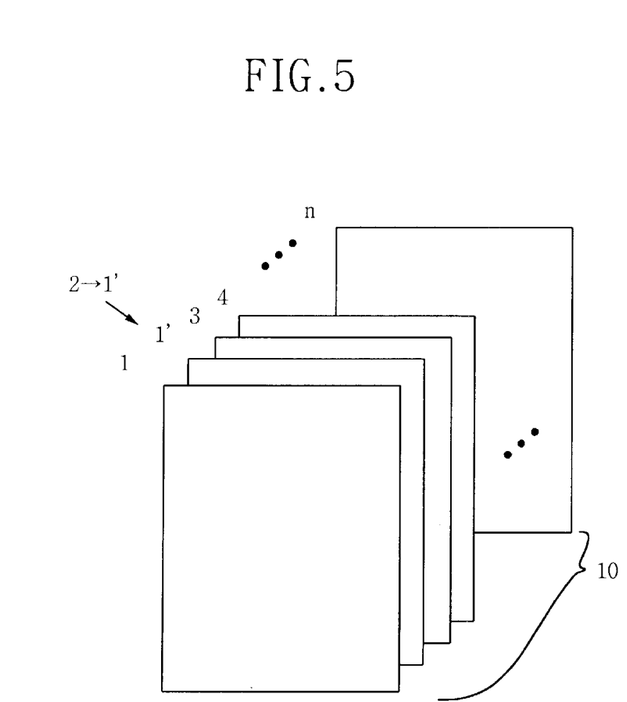
FIG. 5 is an illustration explaining a macro process for storing a macro command comprising a large series of external instructions within a plurality of macro storage sections of the synchronous semiconductor memory device of FIG. 3, showing the result when the number of macro instructions exceeds the capacity of the macro storage means according to one aspect of the present invention.

As represented in FIG. 5, according to a macro process for storing a macro command comprising a large series of external instructions, in the event that the series of external instructions being stored during the storage operation exceeds the storage capacity of a selected one of a plurality of macro storage sections 10, the excessive instructions can be stored according to the same method discussed above in another macro storage section. In this illustration, a subsequent macro storage section 2 becomes essentially a continuation 1' of the previous macro storage section 1. In practice, however, the continuation can be made in any partially empty storage section and need not be within a successive storage section.

Figure 6:
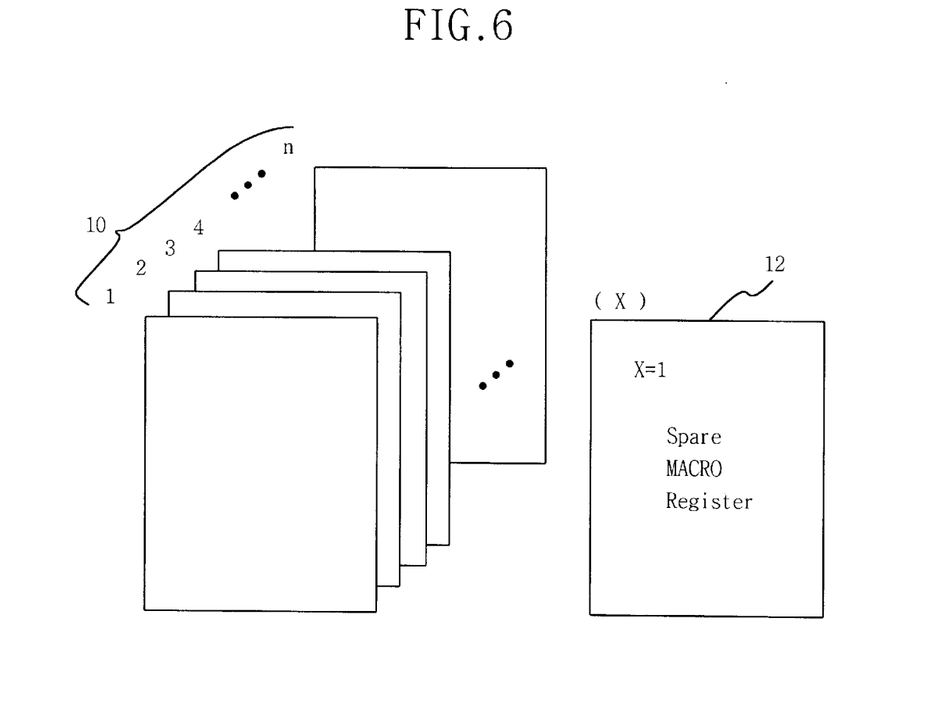
FIG. 6 is an illustration explaining a macro process for storing a macro command comprising a large series of external instructions in a slightly modified version of the synchronous semiconductor memory device of FIG. 3, showing the operation when the number of macro instructions exceeds the capacity of the macro storage means according to another aspect of the present invention.

Referring to FIG. 6, as an alternative to the macro process for storing a macro command comprising a large series of external instructions discussed above, in the event that a series of instructions being stored in a macro storage section exceeds the storage capacity of that section, the excessive instructions can be stored in an auxiliary macro storage section 12, which may be provided within the semiconductor memory device of the present invention.

Figure 7:
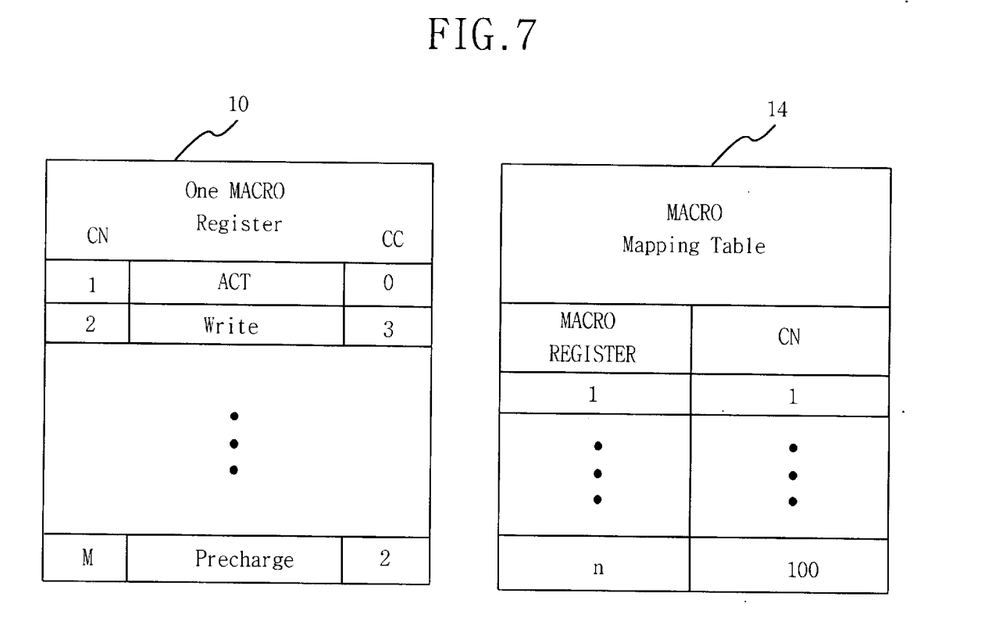
FIG. 7 is an illustration representing a method for effective use of the storage region of the macro storage mean(s) of the synchronous semiconductor memory device of FIGS. 1 and 3.

Referring to FIGS. 1, 3 and 7, another potential aspect of the present invention allows for effective use of the macro storage section(s) 10. Accordingly, a plurality of macro commands, each comprising a series of external instructions, a plurality of interval data values CC, and an initial address value CN; and a macro mapping table 14, comprising a plurality of macro names and the initial address values CN corresponding to the plurality of macro commands; are stored in the macro storage section(s) 10. Specifically, a macro execute command can be performed by reading out the initial address value CN from the mapping table 14 corresponding to a desired one of the macro commands and searching for the location within the macro storage section(s) 10 which corresponds to the initial address value CN. Such a method contributes to the effective use of the storage places within the macro storage section(s) 10 by allowing multiple macro commands, or parts thereof, to be located within a single macro storage section 10.

Figure 8:
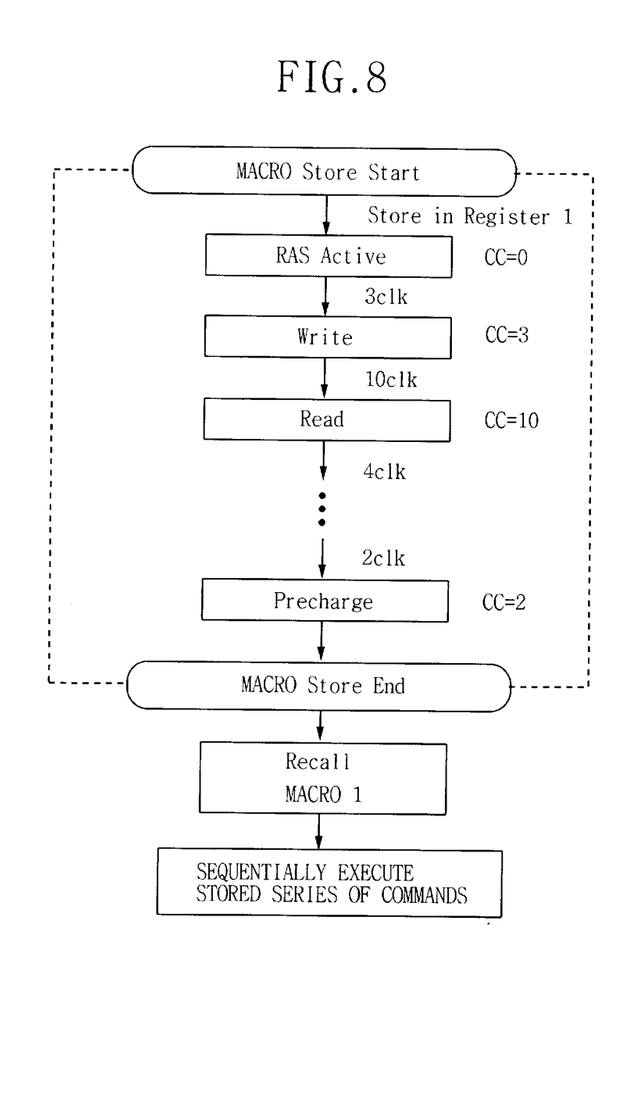
FIG. 8 is an algorithm diagram illustrating a macro command storing and execution method of the synchronous semiconductor memory devices of FIGS. 1 and 3, according to one aspect of the present invention.

Referring to FIGS. 1, 3 and 8, the specific operation of the semiconductor memory device according to the first and second embodiments of the present invention as described above will be explained. In a normal mode, the selection section 30 selects a current external instruction and processes the current external instruction as an internal instruction. However, according to a method of performing a storage operation, illustrated in FIG. 8, a macro control signal MAC and a selection command are applied to a macro control section 50, whereby the macro control section 50 produces a selection signal RS for selecting one of the plurality of macro storage sections 10 (in the second preferred embodiment) and a macro store command ST for controlling a macro storage section 10. The macro control section 50 also produces a reset signal RE to initialize the counter 20. Thereafter, in response to the chip selection signal CSB, the macro control section 50 sequentially stores each external instruction within the series of external instructions and its corresponding interval data value CC, as counted by the counter 20, within the selected macro storage section 10. According to the example shown in FIG. 8, the macro control section 50 stores into the macro storage section 10 an external instruction of "RAS active" and its interval data value CC "0" in response to the input of a RASB command. It then stores an external "write" instruction and its interval data value CC "3" after a period of three clock cycles and resets the clock counter 20. Next, it stores an external "read" instruction and its interval data value CC "10" after a period of 10 more clock cycles. Thereafter, the clock counter is again initialized. Finally, an external "precharge" instruction, which is the last external instruction of the macro command, and its corresponding interval data value CC "2" is stored after a period of 2 more clock cycles.

After storing the series of commands and their corresponding interval data CC into the macro storage section 10, the macro control section 50 terminates the macro command storage in response to a macro storage termination command transmitted through the address signal ADDR. During the storage operation discussed above, the selecting section 30 selects the external instruction being applied to the macro storage section 10, such that the external instruction is outputted as the internal instruction at the same time it is being stored in the macro storage section 10. Accordingly, the internal instruction is executed by an internal circuit of the semiconductor memory device while its corresponding external instruction is being stored.

Still referring to FIGS. 1, 3 and 8, according to a method for executing a macro command of the present invention, an input selection command of a macro control signal MAC and an address signal ADDR is applied to the macro control section 50. The macro control section 50, thereby selects a macro storage section 10 among a plurality of macro storage sections 10 in response to the selection command (in the second preferred embodiment only). The macro control section 50, further controls the first selection section 30 and the second selection section 60 (in the second preferred embodiment) so as to select an external instruction from the selected macro storage section and its corresponding interval data value CC. Thereafter, when macro execute command is applied, the counter 20 is initialized and counts a number of clock pulses occurring from the point when an external instruction is initially read out from the macro storage means 10. The counter 20 also produces an output CP corresponding to this number of clock pulses. The comparing section 40 compares the output CP from the clock counter 20 with the selected interval data value CC and provides a coincidence signal to the macro control section 50 when the values CC and CP coincide with each other. When the coincidence signal is received by the macro control section 50, the macro control section 50 provides a next command to the storage section 10 to read out a next one of the external instructions and its corresponding interval data value CC. The macro control section 50 then also provides an initialization command to again initialize the counter 20. The macro control section 50 terminates execution of the macro command in response to a macro termination command given upon execution of last external instruction of the macro command.

The input of a new macro operation command during the execution of a current macro command will be recognized by the chip selection signal CSB. In that event, any of the following steps can be performed:

1. Stop the execution of the current macro command;
2. Hold the execution of the current macro command;
3. Execute the new macro operation command simultaneously with the execution of the current macro command if it is possible to do so, or ignore the new macro operation command; or
4. Ignore the new macro operation command.

When the stop, hold, or ignore step is chosen, such a condition may be indicated under the control of the macro control section 50.

Figure 9:
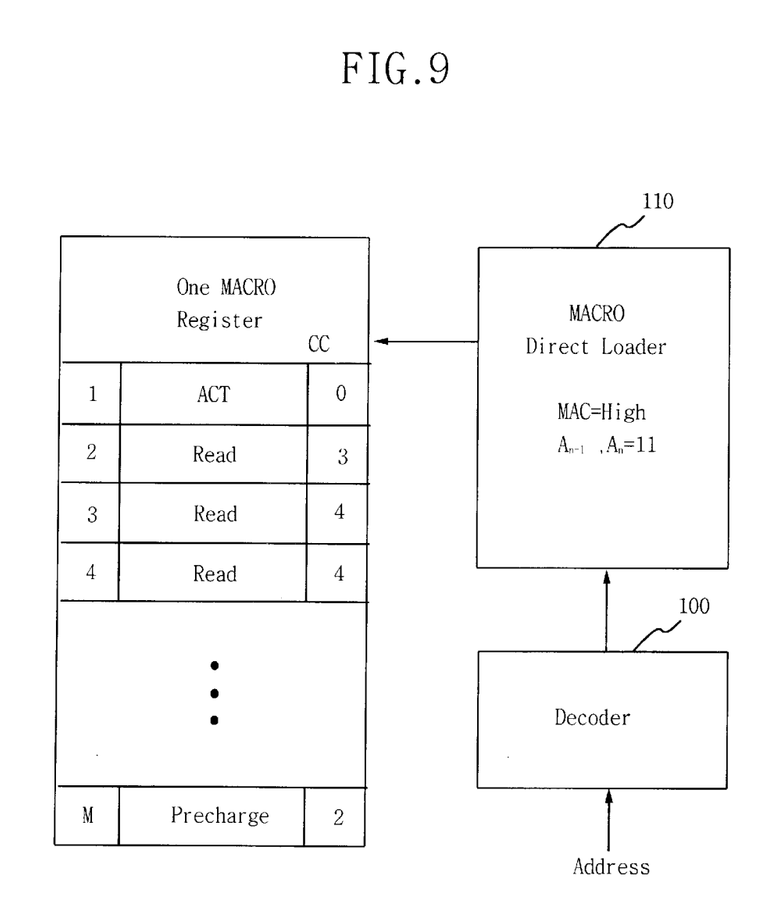
FIG. 9 is an illustration explaining a direct macro command storing method of the synchronous semiconductor memory devices of FIGS. 1 and 3, according to another aspect of the present invention.

Referring to FIG. 9, according to another aspect of the present invention, a macro command can be stored directly into a macro storage section 10 of a chip. Specifically, a direct input mode is determined by a combination of an upper two bits of a macro control signal MAC and an address signal ADDR Once the direct input mode is determined, a series of external instructions and a corresponding plurality of interval data values CC are applied to the chip as a binary code through a data input or an address input. The external instructions being applied to the chip are decoded by a decoder 100 in the chip and the decoded instructions and their corresponding interval data are stored in the macro storage section 10 through a macro loader 110.

According to the foregoing disclosure, describing various embodiments and aspects of the present invention, it can be seen that this invention enables a macro command comprising a series of external instructions to be combined and stored in a synchronous semiconductor memory device. This invention also provides for the external instructions stored in the synchronous semiconductor memory device to be sequentially executed by an externally provided macro execute command. Accordingly, the present invention has the advantages of effective memory access with a low bandwidth, since the frequency of the commands required during the CPU's access of memory can be relatively reduced, and of effective and systematic access of memory resulting from the use of a controller's own macro storage capability in the designing of a memory controller.

In other words, the semiconductor memory device according to the present invention is a new conceptual device having a leading function, so that system designers can freely make and use macro commands suitable for their own circumstances.

While the present invention has been described and illustrated herein with reference to the preferred embodiments thereof, it will be understood by those skilled in the art that various changes in form and details may be made therein without departing from the spirit and scope of the invention.

What is claimed is:

1. A synchronous semiconductor memory device which, in operation, operates in synchronism to a clock signal producing a series of clock pulses, said device comprising:
   macro storage means for storing a macro command;
   means for counting said clock pulses producing an output;
   means for selecting between a current external instruction and an external instruction of the macro command, the means for selecting producing an internal instruction corresponding to a selected external instruction;
   means for comparing an interval data value of the selected external instruction with the output of said counting means; and
   macro control means for controlling said macro storage means to accomplish a store operation in response to a macro store command, for controlling said selecting means to select and execute the macro command in response to a macro execute command, and for controlling a read-out of the macro command.

2. The synchronous semiconductor memory device of claim 1, in which the macro command comprises a series of external instructions and a plurality of interval data values, each interval data value corresponding to a respective one of the external instructions, and each interval data value equal to a number of clock pulses occurring between the respective external instruction and a previous one of the external instructions, the number of clock pulses occurring between the respective and previous external instructions being determined during a store operation of the macro command.

3. The synchronous semiconductor memory device as claimed in claim 1, wherein a plurality of macro commands and a macro mapping table are stored within the macro storage means, each macro command comprising a macro name, and the macro mapping table comprising the macro names of said macro commands and a start initial address, such that the start initial address from the macro mapping table can be used to find and execute a desired one of the macro commands within the macro storage means.

4. The synchronous semiconductor memory device as claimed in claim 1, wherein said macro storage means comprises a read only memory.

5. The synchronous semiconductor memory device as claimed in claim 1, wherein said macro storage means comprises a non-volatile memory.

6. The synchronous semiconductor memory device as claimed in claim 4, wherein said macro command stored in said read only memory is a test command.

7. The synchronous semiconductor memory device as claimed in claim 1, wherein said macro store command and said macro execute command are determined by a combination of an external macro control signal and an external address signal.

8. The synchronous semiconductor memory device according to claim 1, in which:
   the macro storage means comprises a plurality of macro storage means for storing a plurality of macro commands, each macro command comprising a series of external instructions and a plurality of interval data values, each interval data value corresponding to a respective one of the external instructions, and each interval data value equal to a number of clock pulses occurring between the respective one of the external instructions and a previous one of the external instructions;
   the means for selecting comprises a first and a second selecting means, the first selecting means for selecting between a current external instruction and one of the external instructions of one of the macro commands and for producing an internal instruction corresponding to a selected one of the external instructions, and the second selecting means for selecting a selected one of the interval data values from said plurality of macro storage means, corresponding to the selected one of the external instructions from the series of external instructions;
   the means for comparing capable of comparing the selected one of the interval data values with the output of said counting means and producing a coincidence signal when the selected one of the interval data values is equal to the output of the means for counting; and the macro control means configured to control said plurality of macro storage means in response to the macro store command such that the macro command is stored within a selected one of the macro storage means, and configured to control said first and second selecting means to select a first one of said external instructions and a corresponding one of the interval data values, respectively, from a selected one of the macro commands in response to a macro execute command, and the macro control means also configured to perform a read-out operation of the series of external instructions from the selected macro command by executing a next command to select and execute a subsequent one of the external instructions in response to the coincidence signal of the means for comparing, such that the external instructions in the series of external instructions are sequentially read out at appropriate intervals.

9. The synchronous semiconductor memory device as claimed in claim 8, further comprising a command decoding means coupled between an input terminal and said plurality of macro storage means for decoding the series of external instructions.

10. The synchronous semiconductor memory device as claimed in claim 8, wherein a portion of the plurality of macro storage means comprises a read only memory.

11. A method for storing the macro command of the synchronous semiconductor memory device as claimed in claim 8, wherein, in the event that said series of external instructions being stored in one of the macro storage means exceeds a storage capacity thereof, the external instructions exceeding said storage capacity are successively stored in another one of said macro storage means.

12. The synchronous semiconductor memory device as claimed in claim 1, further comprising an auxiliary macro storage means for storing an external instruction in the event that said series of external instructions being stored in the macro storage means exceeds a storage capacity thereof.

13. The synchronous semiconductor memory device as claimed in claim 8, further comprising:
    an output buffer for buffering said macro execute command; and
    an output terminal communicating with the output buffer for externally supplying said macro execute command provided through said output buffer.

14. The synchronous semiconductor memory device as claimed in claim 8, wherein one of said macro storage means stores a macro test command therein.

15. The synchronous semiconductor memory device as claimed in claim 14, wherein said macro storage means in which said macro test command is stored comprises a read only memory.

16. A synchronous semiconductor memory device according to claim 1, wherein said device further comprises:
    a command decoder for decoding an external command code to provide the macro storage means with a plurality of interval data values corresponding to a series of external instruction of the macro command; and
    a macro loading means for directly loading into said macro storage means said series of external instructions and the interval data values provided from said command decoder in response to the macro store command.

17. A method of storing a macro command in a synchronous semiconductor memory device, comprising:
    inputting a macro control signal and a macro selection command into a macro control means of the synchronous semiconductor memory device;
    inputting a macro store command into the macro control means;
    initialing a clock counter in response to said macro store command;
    sequentially storing in a macro storage means a series of external instructions and a corresponding plurality of interval data values in response to a chip selection signal; and
    terminating said macro storing step in response to a macro termination command supplied to the control means.

18. The method of storing a macro command according to claim 17, the method further comprising:
    selecting one of a plurality of macro storage means in response to said macro selection command.

19. A method of executing a macro command from a synchronous semiconductor memory device, comprising:
    inputting a macro control signal and a macro selection command into the synchronous semiconductor memory device;
    inputting a macro execute command into the synchronous semiconductor memory device;
    initializing a clock counter in response to said macro execute command;
    reading out from a macro storage means an external instruction and a corresponding interval data value;
    comparing the interval data value with a number of clock pulses counted by said clock counter;
    in the event that the interval data value is equal to the number of clock pulses counted by the clock counter, executing said external instruction as an internal instruction, initializing said clock counter, and reading out a next external instruction and the corresponding interval data value from said selected macro storage means; and
    terminating said macro command execution if an entire series of said external instructions stored within the macro storage means have been executed by repeatedly performing said steps as above.

20. The method of executing a macro command according to claim 19, the method further comprising:
    selecting one of a plurality of macro storage means in response to said macro selection command.

21. A method for maintaining interval integrity between subsequent external instructions in a macro command of a synchronous semiconductor memory device during a store operation, wherein, in the event that a number of clock pulses between said subsequent external instructions exceeds an upper limit counted value of a counting means, a dummy instruction and said upper limit counted value are stored in a macro storage means between the subsequent external instructions as an external instruction and a respective interval data value, respectively.

* * * * *

UNITED STATES PATENT AND TRADEMARK OFFICE
CERTIFICATE OF CORRECTION

PATENT NO. : 5,923,612
DATED : July 13, 1999
INVENTOR(S) : Park et al.

It is certified that error appears in the above-identified patent and that said Letters Patent is hereby corrected as shown below:

Column 5,
Line 57, "lock pulses" should be -- clock pulses --.

Column 6,
Line 16, "section S0" should be -- section 50 --.

Column 7,
Line 17, "macro storage section" should be -- macro storage section 10 --.

Column 12,
Line 9, "initialing" should be -- initializing --.

Signed and Sealed this

Twenty-sixth Day of March, 2002

Attest:

*Attesting Officer*

JAMES E. ROGAN
*Director of the United States Patent and Trademark Office*